A. Codding Jr,

Bracelet.

No. 4,253. Reissued Feb. 7. 1871.

Witnesses:
John D. Thurston
Peter F. Hughes

Inventor:
Ariel Codding jr
by B. F. Thurston
atty

N. PETERS, PHOTO-LITHOGRAPHER, WASHINGTON, D. C.

United States Patent Office.

ABIEL CODDING, JR, OF NORTH ATTLEBOROUGH, MASSACHUSETTS.

Letters Patent No. 91,604, dated June 22, 1869; reissue No. 4,253, dated February 7, 1871.

IMPROVEMENT IN THE MANUFACTURE OF ENAMELED BRACELETS.

The Schedule referred to in these Letters Patent and making part of the same.

*To all whom it may concern:*

Be it known that I, ABIEL CODDING, Jr., of North Attleborough, in the county of Bristol and State of Massachusetts, have invented new and useful Improvements in the Manufacture of Bracelets; and I do hereby declare that the following is a full, clear, and exact description thereof, which will enable those skilled in the art to make and use the same, reference being had to the accompanying drawing forming part of this specification, in which—

Similar letters of reference indicate corresponding parts.

The object of this invention is to provide a more simple and inexpensive method of manufacturing a kind of bracelet called enameled bracelets, and consists in such construction as will allow the two parts or plates composing the hoop of the bracelet to be mechanically held together by means of two flanged edges on one of them, which are bent around the edges of and down upon the other.

Figure 4:
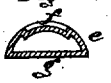
Figure 4 is a cross-section, showing the method heretofore followed in making enameled bracelets.

Heretofore it has been customary to strike up a convex plate, fig. 4, with a recess in its convex surface, in which the enamel *f* was inlaid, and to solder on the inner plate *g*, as shown.

This method involved considerable skill and time in putting in the enamel, and the bracelet so made was liable to become damaged by its peeling out of the recess.

By my improved method, however, these objections are obviated.

In the drawing—

*a* is the inner plate or band of sheet metal formed by any proper tool or machine, with upset or flanged edges *c c*.

*d* is an enameled plate of sheet metal, formed with a concavo-convex cross-section, by means of any proper tool, or by running it through suitable rolls.

Figure 1:
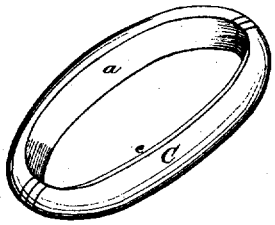
Figure 1 is a perspective view of my improved bracelet.
Figure 2:
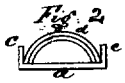
Figure 2 is a cross-section, showing the position of the parts before the flanged edges of the one part or plate are bent around the edges of and down upon the other.
Figure 3:
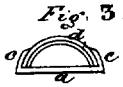
Figure 3 is a cross-section of the bracelet complete.

This plate is then laid between the flanges *c c*, and the latter are pressed down against the enameled surface, as shown at fig. 3 and 4.

Instead of an enameled plate of sheet-metal, a solid fillet of any suitable enameling matter having a plano-convex cross-section may be substituted, and the edges *c c* pressed down upon it, as before described.

By means of my invention I am enabled to employ an enameled plate of metal, or any solid substitute or imitation of the same, as hard rubber and other like matter.

The edges *c c* are bent down in practice by running the two plates through a semicircular opening through a plate or through any other suitable device. The plate *a* may be of gold or plated imitation of the same.

The enameling matter is the same commonly used in making enameled work, and may be of any color desired or jet imitation.

I desire to be understood as not limiting myself to the use of an enameled plate, for a plain plate of metal may be united with the inner plate *a* in a similar manner, and the construction of the bracelet be as improved as if an enameled plate was used, and inasmuch as the invention resides in the means whereby the two plates composing the hoop of the bracelet are united together, it will constitute a substantial employment of my invention to provide the upper convex plate with flanges, and bend them around the edges and down upon the inner plate.

I claim as new and desire to secure by Letters Patent—

The improvement in the construction of bracelets, which resides in uniting the outer plate *d* and inner band or plate *a* by means of flanges *c c*, substantially as described.

ABIEL CODDING, JR.

Witnesses:
J. A. HAWES,
HENRY RICE.